Sept. 11, 1923.

J. TRUST ET AL 1,467,770

FOOD MACHINE

Original Filed Feb. 11, 1918   2 Sheets-Sheet 1

INVENTORS
Josephine Trust.
Henry Trust.
BY
ATTORNEY

Sept. 11, 1923.                                               1,467,770
                        J. TRUST ET AL
                         FOOD MACHINE
              Original Filed Feb. 11, 1918    2 Sheets-Sheet 2

INVENTORS:
Josephine Trust.
Henry Trust.
BY
ATTORNEY

Patented Sept. 11, 1923.

1,467,770

UNITED STATES PATENT OFFICE.

JOSEPHINE TRUST AND HENRY TRUST, OF PARK RIDGE, NEW JERSEY, ASSIGNORS, BY MESNE ASSIGNMENTS, TO FITCHBURG MACHINE WORKS, OF FITCHBURG, MASSACHUSETTS, A CORPORATION OF MASSACHUSETTS.

FOOD MACHINE.

Substitute for application Serial No. 216,537, filed February 11, 1918. This application filed September 16, 1919. Serial No. 324,135. Renewed July 9, 1923.

*To all whom it may concern:*

Be it known that we, JOSEPHINE TRUST and HENRY TRUST, citizens of the United States, residing at Park Ridge, in the county of Bergen and State of New Jersey, have invented certain new and useful Improvements in Food Machines, of which the following is a specification, reference being had therein to the accompanying drawing.

My invention relates to improvements in crushers and strainers and has particular reference to a device of the class described adapted to crush the juice from vegetables or fruit at the same time straining the same.

Figure 1:
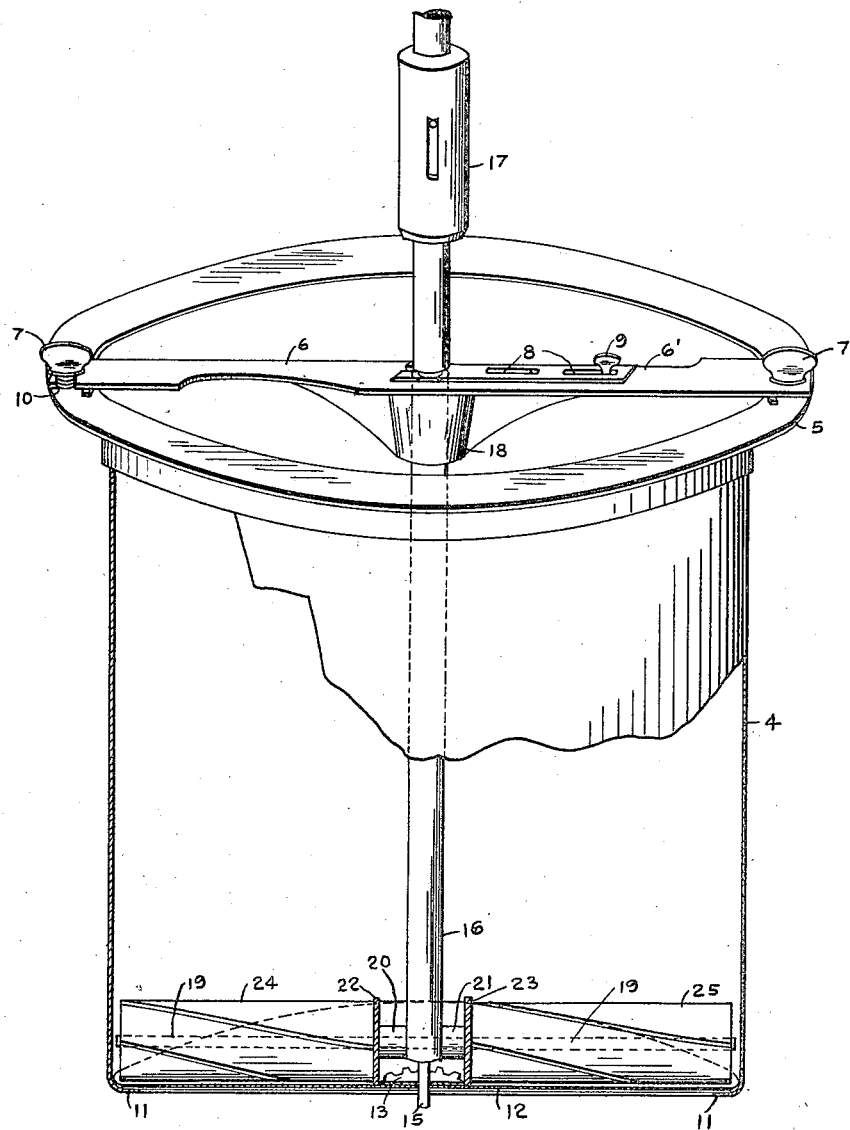
Figure 2:
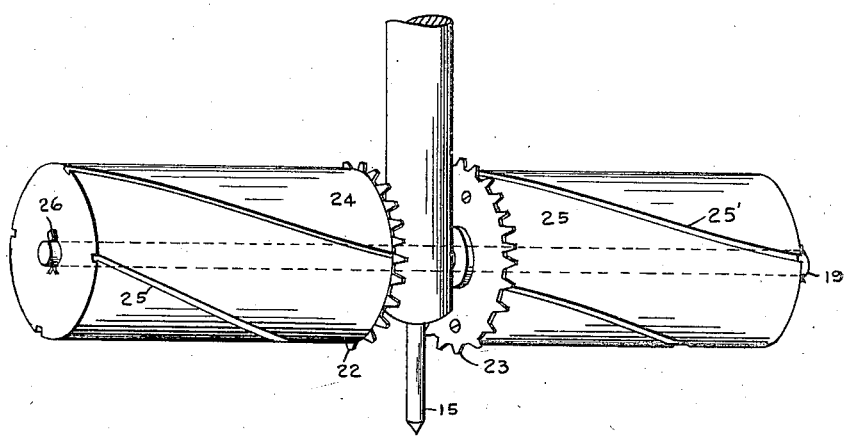
Figure 3:
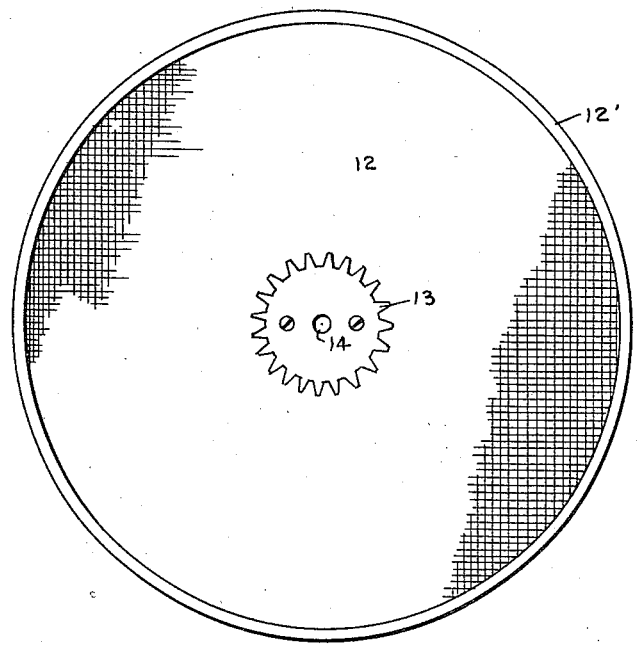

Referring to the accompanying drawings, Fig. 1 illustrates in perspective a suitable form of crusher and strainer, partly in cross section, embodying an application of my invention. Fig. 2 is an enlarged perspective detail, partly broken away, illustrating the rollers or crushers, and Fig. 3 is a plan view of a suitable form of screen. 4 indicates a bottomless pail or chamber upon the top flange 5 of which may be secured the cross bar 6—6' by suitable means such as the wing nuts 7, said cross bar 6 cut away to clear the spindle 16 and having a plate with elongated slots such as 8 through which the wing nut 9 may be screwed down upon a screw projecting upwardly from the bar 6 thus allowing for adjustments for pails or containers of different diameters, the nuts of the bars 6—6' being cut away as indicated at 10 to allow clearance for the wing nut 7. The bottom of the pail or container 4 terminates in an inwardly projecting flange or ledge 11 upon which a screen such as 12, shown to better advantage in Fig. 3, may rest. Said screen is preferably provided with a pinion such as 13 suitably secured thereto and provided with a central hole 14 through which the end 15 of the shaft 16 may pass, such shaft being adapted to be driven by the chuck 17 within which it may be secured in any well known manner and being adapted to be braced by the bearing 18 provided by the adjustable straps 6—6' as shown.

19 indicates a shaft or spindle passing through the bar of shaft 16 at right angles and 20—21 indicates sleeves upon said shaft or spindle 19 separating the gears 22—23 from said drive shaft or spindle 16. Said gears being secured upon the rollers 24—25 as shown and being adapted to mesh with the pinion 13 secured to the screen 12. 25' indicates suitable spiral grooves in the rollers over 24, 25 and 26 indicates a convenient method of securing the rollers upon the shaft 18.

From the foregoing it will be seen that when the pail or chamber 4 is retained in the suitable bracket or support, upon rotating the shaft 16 the gears or pinions 22—23 attached to the drums or crushers 24—25 respectively are rotated and the same being in close proximity to the surface of the screen 12 crush the fruit or vegetables fed into the chamber or pail 4 allowing the juice to pass through the screen.

Of course it will be understood that screens of various meshes and coarseness secured upon outer frames such as 12' may be deposited in the chamber or pail 4 upon the ledge or flange 11 and various modifications may be made in the arrangement and construction of parts without departing from the spirit of the invention as claimed.

We claim:

1. In a food preparing machine, a food container having a bottom opening, a removable perforated bottom member supported by said container and filling said opening, a gear fast on said bottom member, a driving shaft axially disposed in said container, upper and lower bearings for said shaft, said lower bearing being supported by said bottom member, a cross rod on said driving shaft, a pair of rolls mounted for rotation on said cross rod, and gears on said rolls engaging the fixed gear and positively rotating said rolls as said driving shaft is revolved.

2. In a food preparing machine, a food container having a bottom opening, a removable perforated bottom member supported by said container and filling said opening, a gear fast on said bottom member, a driving shaft axially disposed in said container, an upper bearing for said shaft, said gear having an axial opening forming a lower bearing for said shaft, a cross rod on said driving shaft, rolls mounted for rotation thereon, and gears on said rolls engaging said fixed gear to positively rotate said rolls.

3. In a food preparing machine, a food container having a bottom opening, a removable perforated bottom member supported by said container and filling said opening, a gear fast on said bottom member, a driving shaft axially disposed in said container, upper and lower bearings for said shaft, said lower bearing being supported by said bottom member, a cross rod on said driving shaft, a pair of rolls mounted for rotation on said cross rod, and gears on said rolls engaging the fixed gear and positively rotating said rolls as said driving shaft is revolved, said rolls being each provided with a plurality of spiral grooves extending from end to end of said rolls and disposed at a relatively small angle to the roll axis, each groove making a fractional turn only about the roll.

4. In a food preparing machine, a food container having a bottom opening, a removable perforated bottom member supported by said container and filling said opening, a gear mounted in fixed position in said container and closely adjacent said bottom member, a driving shaft axially disposed in said container, upper and lower bearings for said shaft, said lower bearing being closely adjacent said fixed gear, a cross rod on said driving shaft, a pair of rolls mounted for rotation on said cross rod, and gears on said rolls engaging the fixed gear and positively rotating said rolls as said driving shaft is revolved.

In testimony whereof we hereunto affix our signatures in the presence of two witnesses.

JOSEPHINE TRUST.
HENRY TRUST.

Witnesses:
MADELINE C. FOERST,
DAVID H. DOUGLASS.